Oct. 19, 1937.  E. M. MANE ET AL  2,096,461
MEASURING FILLER FOR LIQUIDS OF ALL KINDS
Filed March 20, 1936   2 Sheets-Sheet 1
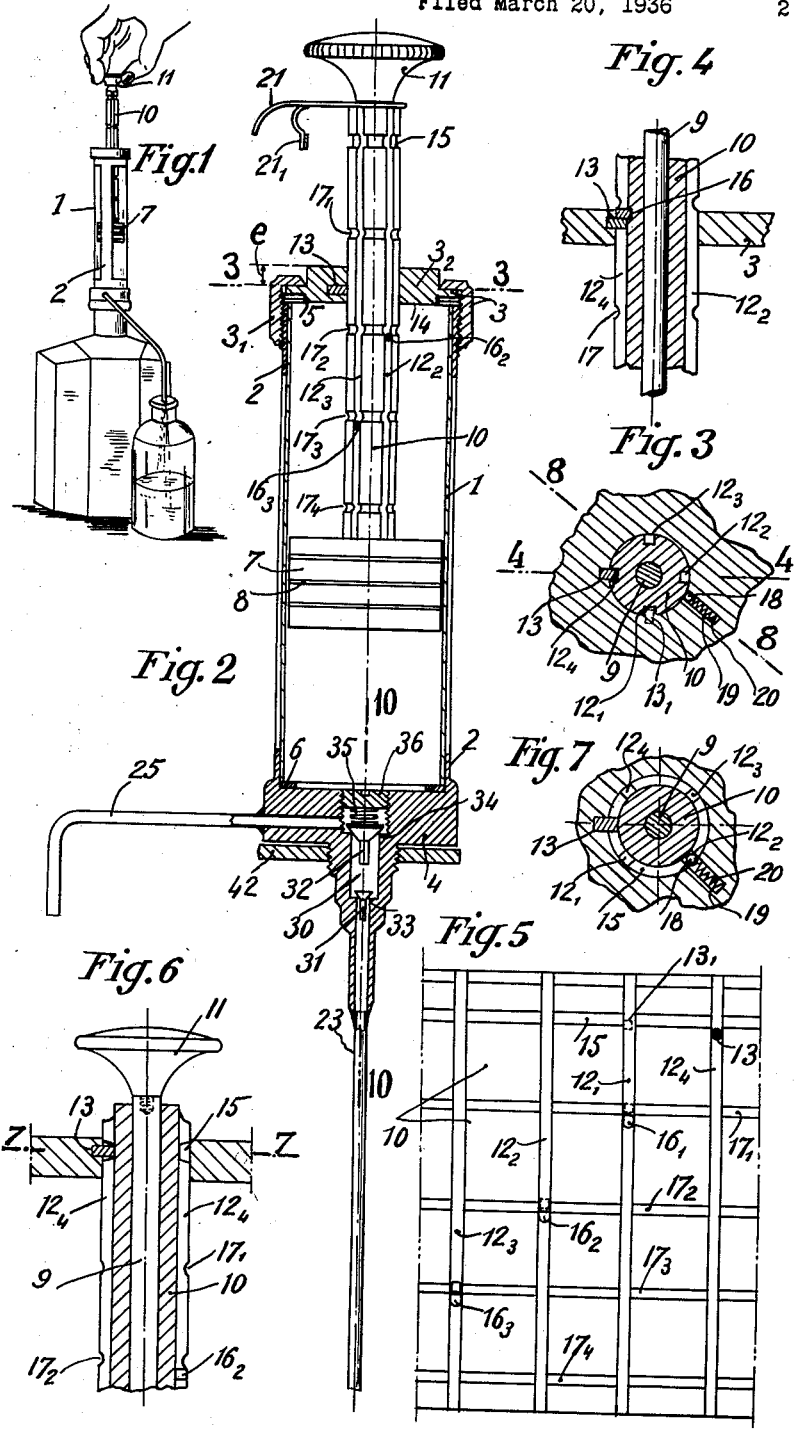
EUGENE MAURICE MANE + GABRIEL PIERRE MANE
INVENTORS
THEIR ATT'Y.

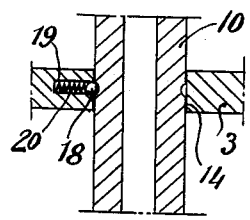
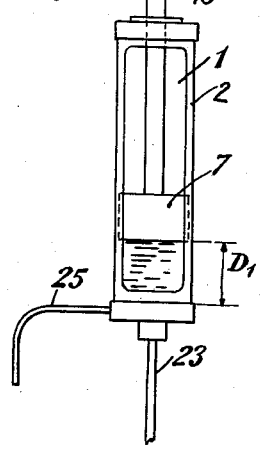
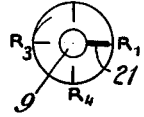
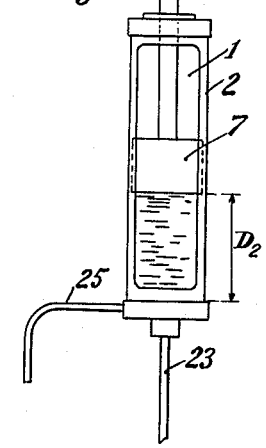
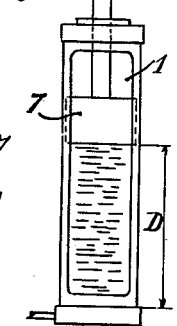
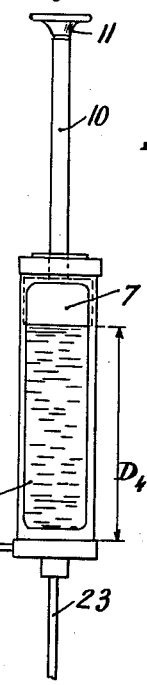
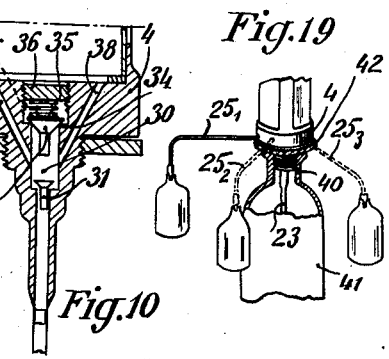

Patented Oct. 19, 1937

2,096,461

UNITED STATES PATENT OFFICE 2,096,461

MEASURING-FILLER FOR LIQUIDS OF ALL KINDS

Eugene Maurice Mane and Gabriel Pierre Mane, Bar-sur-Loup, near Grasse, France

Application March 20, 1936, Serial No. 69,754
In France October 15, 1935

6 Claims. (Cl. 221—103)

The object of the present invention is to provide means for measuring different quantities of liquids with one and the same apparatus in such a manner as to avoid all waste of the liquid when it is necessary to fill a receptacle having a volume which is less than the maximum volume of liquid in the measuring means, while another object of the invention is to enable the measuring device to be controlled, while it is in different positions, in a particularly simple and convenient manner.

A further object of the invention is to provide a filling and measuring apparatus that can be constructed and assembled simply and easily without requiring exact and careful manufacture of its parts.

A measuring-filler which enables the foregoing objects to be realized possesses the features set forth in the following description and in the claims appended at the end of the said description.

The preferred form of the invention is illustrated, by way of example, in the accompanying drawings wherein:

Fig. 1 is an elevation of the complete measuring-filler as mounted on a container.

Fig. 2 represents an axial section of the filler of Fig. 1 (the plunger not being shown in section).

Fig. 3 represents a fragmentary transverse section taken on the line 3—3 of Fig. 2.

Fig. 4 is a fragmentary axial section taken on the line 4—4 of Fig. 3.

Fig. 5 is a diagrammatic, developed view of the surface of the sleeve surrounding the piston rod and having grooves with staggered stops.

Fig. 6 is a fragmentary axial section similar to that of Fig. 4 but with the piston rod in a different position.

Fig. 7 is a transverse section taken on the line 7—7 of Fig. 6.

Fig. 8 is an axial section taken on the line 8—8 of Fig. 3.

Fig. 9 is a detail view in perspective showing, more specifically, the scale and the graduations.

Fig. 10 is a section taken on the line 10—10 of Fig. 2.

Figs. 11 and 12 denote, respectively, an elevation and a plan view of the complete device with the piston at the bottom of its delivery stroke.

Figs. 13–18 denote views similar to the two foregoing ones but with three different positions of the piston.

Fig. 19 is a fragmentary perspective view showing different possible positions of the delivery tube.

The apparatus shown in the accompanying drawings comprises a cylinder 1 of glass (Figs. 1 and 2) enclosed in a metallic, perforated frame 2. This cylinder 1 is secured between two end members 3 and 4, which are screwed to the frame 2, and sealing rings 5, 6 are inserted between these various elements to ensure that the cylinder is held tightly in place, while at the same time all risk of the glass cylinder 1 being broken is avoided.

Within the cylinder 1 is movable a piston 7 having packing grooves 8 to ensure tightness. The piston rod 9 is surrounded by a sleeve 10 (Figs. 2–4) which engages frictionally on the rod 9 in such a manner as to allow these two members to rotate easily relatively to each other.

The sleeve 10 (Fig. 2) bears at its lower extremity on the piston 7 itself and at the other end against the handle 11 by which the piston is operated. In this way the sleeve 10 always follows the piston 7 in its longitudinal movements.

The sleeve 10 is provided with longitudinal grooves $12^1$, $12^2$, $12^3$ and $12^4$ (Figs. 2–5) spaced round the periphery of the said sleeve 10 as is clearly shown in the representation of the developed surface of the sleeve (Fig. 5). The grooves $12^1$, $12^2$—serve for the reception of a pin 13 (Figs. 2, 3, 4) integral with the upper end member 3. This pin 13 projects into the interior of the central hole 14 in the end member 3 through which the sleeve slides.

The grooves $12^1$, $12^2$, $12^3$, $12^4$ of the sleeve 10 all communicate with a circular channel 15 (Figs. 2, 5, 6, 7) cut near the upper end of the said sleeve, and this channel 15 thus allows the pin 13 to pass from one groove to another when the sleeve 10 is rotated.

Each groove $12^1$, $12^2$, $12^3$ is provided with a stop $16^1$, $16^2$, $16^3$ (Figs. 2, 5, 6) which interrupts the continuity of the groove, but the groove $12^4$ has no stop.

The stops $16^1$, $16^2$, $16^3$ are staggered relatively to each other both angularly and longitudinally as is clear from Fig. 5 and these stops come into engagement with the pin 13 when the said pin is in any of the corresponding grooves.

The sleeve 10 is also equipped with retaining or locating grooves consisting of circumferential recesses $17^1$, $17^2$, $17^3$, $17^4$ (Figs. 5 and 8) which are not so deep as the longitudinal grooves.

The recess $17^4$ is positioned close to the piston 7, while the other recesses $17^1$, $17^2$, $17^3$ are located in line with the corresponding stops $16^1$, $16^2$, $16^3$ respectively (Fig. 5).

The end member 3 also has a retractable stop such as a ball 18 (Figs. 3, 7, 8) lodged in a cavity 19 of the said end member and pushed by a spring 20; this ball 18 projects into the opening 14 whenever a depression in the sleeve 10 comes opposite the said ball. Thus the ball 18 projects into the recesses $17^1$, $17^2$, $17^3$, $17^4$ when the said recesses come within the opening 14.

According to another characteristic feature of the invention, the upper end member 3 is constructed of two parts;—a cap $3^1$ and a disc $3^2$.

This disc $3^2$ fits freely in the cap $3^1$ and carries the packing ring 5, which is thus interposed between the said disc $3^2$ and the cylinder 1. Thus, due to the free fitting of the disc $3^2$ in the cap $3^1$ and the elasticity of the joint 5, this disc $3^2$ is free to execute small transverse displacements relatively to the said cap $3^1$ and to the measuring cylinder 1. These transverse displacements of the disc $3^2$ generally take place at the time when the piston 2 is being moved, as a result of irregularities in workmanship which lead to a non-symmetrical fitting of the sleeve 10 and in this way all risk of jamming between the various parts of the apparatus is avoided, in spite of any defects in workmanship which may occur.

The disc $3^2$ is of such a thickness that, after being mounted in the cap $3^1$, it, that is to say the disc $3^2$, projects to a certain extent e relatively to the said cap $3^1$.

This projecting part of the disc $3^2$ carries the markings $R^1$, $R^2$, $R^3$, $R^4$ above which moves an index finger 21 (Figs. 2 and 9) located at the top of the sleeve 10. This index-finger 21 has a prolongation $21^1$ which is guided by the projecting part e of the disc 3.

The positioning of the markings $R^1$, $R^2$, $R^3$, $R^4$ is so chosen that when, for example, the index-finger 21 coincides with the marking $R^3$, the pin 13 is in engagement with the corresponding groove $12^3$.

The lower end member 4 accommodates the suction tube-system 23 and also the delivery tube 25.

This lower end member 4 (Figs. 2 and 10) is provided with a suction and delivery chamber 30, which passes through the said member 4 from one side to the other.

The chamber 30 has two suction and delivery valves 31, 32, which normally rest on seats 33, 34 cut in the central channel.

This arrangement simplifies the manufacture because the number of elements is reduced; in addition, the central channel and the seats 33, 34 of the valves 31, 32 may be produced in a single operation and this materially reduces manufacturing operations.

The delivery valve 32 is pressed downwards by a spring 35 which bears at its upper end on a screw 36, which also constitutes a plug, for separating the upper end of the chamber 30 from the interior of the measuring cylinder 1. At the same time, the portion of the chamber 30 situated between the two valves 31, 32 is in communication with the cylinder 1 through two auxiliary channels 37 and 38 (Fig. 10).

Lastly, the portion of the chamber 30 located below the suction valve 31 communicates with the suction tube 23, while the portion of the chamber 30 located above the delivery valve 32 communicates with the delivery tube 25.

During the suction phase (ascending stroke of the piston 7) the liquid which ascends by the suction tube 23 lifts the suction valve 31 (Fig. 2) and enters the cylinder 1 through the auxiliary channels 37, 38.

As soon as the suction stroke ceases, the valve 31 closes under the action of its own weight and during the delivery stroke, the liquid contained in the cylinder 1 returns into the chamber 30 through the auxiliary channels 37, 38, lifts the delivery valve and flows out through the delivery tube 25.

The measuring-filler above described is made use of in the following manner:

In the first place, it must be noted that in order to rotate the index-finger 21 and the sleeve 10 it is necessary that the plunger should be at the bottom of the cylinder (Figs. 6 and 9); in fact, the rotation of the sleeve 10 is prevented by the pin 13 except when the said pin projects into the recess 15 (Fig. 6).

If, for instance, the index-finger 21 is made to coincide with the marking $R^1$ (Fig. 12), this brings the groove $12^1$ opposite the pin 13 as indicated at $13^1$ in Fig. 5. The plunger 7 is then raised by means of the handle 11 and this movement draws in a certain amount of liquid through the tube 23 but the plunger is stopped when the abutment or stop $16^1$ in the groove $12^1$ (Fig. 5) meets the pin 13. This movement of the plunger 7 has thus drawn in a volume of liquid corresponding to a length of stroke $D^1$ (Fig. 11).

In order to deliver this volume liquid, it is only necessary to push back the plunger 7 when the liquid is discharged through the tube 25.

The plunger being again at the bottom of the delivery stroke, the sleeve 10 may be rotated to bring any one of the grooves $12^2$, $12^3$, $12^4$ opposite the pin 13, and since the stops in these grooves are at different distances from the top groove 15 there may be drawn in a volume of liquid corresponding to strokes $D^2$, $D^3$ or $D^4$ of the plunger as indicated in Figs. 13–18.

Each time the index-finger moves over one division of the scale 22 the stroke of the plunger 7 is modified in accordance with the angular and longitudinal staggering of the stops $16^1$, $16^2$, $16^3$, $16^4$.

In the case of the last groove $12^4$ the stop is constituted by the plunger 7 itself, which comes into contact with the upper end member 3. This groove, therefore, corresponds to the total travel of the piston 7 and, consequently, to the maximum volume of liquid drawn in.

It is possible also to provide an indication of the volume measured by marking on the cylinder 1 volume graduations corresponding to the lengths of the strokes $D^1$, $D^2$, $D^3$ and $D^4$.

At the end of each suction stroke $D^1$, $D^2$, $D^3$, $D^4$ the ball 18 springs into one of the recesses $17^1$, $17^2$, $17^3$, $17^4$ and thus indicates to the operator that the plunger 7 is in a position corresponding to a particular volume. Furthermore engagement of the ball 18 in one of the horizontal recesses retains the plunger 7 in position and thus obviates any risk of accidental discharge of the liquid.

Also, the ball 18 rests on the edges of the recess 15 when the plunger 7 is at the end of its delivery stroke and, during the rotation of the sleeve 10, the ball 18 indicates, by snapping into one of the grooves 12, that one or other of the grooves 12 has come into position opposite the pin 13.

It will be noted also that all the adjustment of the length of stroke are produced by turning the sleeve 10 on the rod 9 of the plunger 7. This enables one or other of the grooves $12^1$—to be brought opposite the pin 13 by the rotation of the said sleeve 10 without thereby involving the rotation of the plunger 7 in its cylinder 1.

According to another feature of the invention, the lower end member has a threaded portion 40 which screws on to the supply vessel 41 and receives a lock-nut 42 (Fig. 19).

In this way it is possible to vary the position of the discharge tube 25, while still retaining the apparatus securely fixed to the supply bottle 41.

If, for example, the discharge tube 25 is in the position $25^1$ (Fig. 19), it is sufficient to unscrew the lock-nut 42 and rotate the apparatus relatively to the bottle 41 to move the tube 25 to the position 25² or 25³ and to secure the lock-nut 42 again.

In this way it is possible to position the discharge tube 25 in the most favourable manner for the reception of the amount of liquid measured. In this way any loss of liquid as a result of incorrect positioning of the discharge tube is avoided.

It will be seen that there is obtained, according to the invention, a measuring-filler by means of which predetermined different volumes of liquid can be measured and in which the transition from one predetermined volume to another is brought about by a very simple manipulation. This measuring-filler renders it possible also to replenish bottles with accuracy and without risk of loss.

What we claim as our invention and desire to secure by Letters Patent is:—

1. In a measuring-filler for liquids; a receptacle for a liquid; a pump cylinder mounted on the receptacle and having a suction tube dipping into the liquid of the receptacle and a delivery tube; a plunger movable within the said cylinder; a manipulating rod secured to the said plunger, the said manipulating rod being free to rotate within the pump cylinder and carrying longitudinal grooves on its periphery and an annular recess which establishes communication between all the longitudinal grooves; an arresting member carried by the cylinder and engaging in the annular recess and then, owing to the rotation of the manipulating rod relatively to the cylinder within the prolongation of one of the longitudinal grooves of the said manipulating rod; and stops carried by the manipulating rod and disposed in each of the longitudinal grooves, the said stops being staggered longitudinally and coming into engagement with the arresting member so as to limit the travel of the plunger within the cylinder of the pump.

2. In a measuring-filler for liquids: a receptacle for a liquid; a pump cylinder mounted on the receptacle and having a suction tube dipping into the liquid in the receptacle and a delivery tube; a plunger movable within the said cylinder; a manipulating rod secured to the said plunger, the said manipulating rod being free to rotate within the pump cylinder and carrying longitudinal grooves on its periphery, and an annular depression establishing communication between all the longitudinal grooves; an arresting member carried by the cylinder and engaging in the annular depression and then, owing to the rotation of the manipulating rod relatively to the cylinder presenting itself in the prolongation of one of the longitudinal grooves of the said manipulating rod; a retractible stop carried by the cylinder and engaging in one of the longitudinal grooves of the manipulating rod and retaining the said manipulating rod in a position for the engagement of the arresting member with one of the longitudinal grooves; and stops carried on the manipulating rod and disposed in each of the longitudinal grooves, the said stops being staggered longitudinally and coming into engagement with the arresting member so as to limit the travel of the plunger within the pump cylinder.

3. In a measuring-filler for liquids: a receptacle for a liquid; a pump cylinder mounted on the receptacle and having a suction tube dipping into the liquid in the receptacle and a delivery tube; a plunger movable within the said cylinder; an operating rod secured to the plunger; an arresting member on the cylinder; a sleeve surrounding and free to rotate on the said operating rod; and stops carried by the sleeve, the said stops being staggered both angularly and longitudinally relatively to each other and coming into engagement with the arresting member so as to limit the travel of the plunger within the pump cylinder.

4. In a measuring-filler for liquids: a receptacle for a liquid; a pump cylinder mounted on the receptacle and having a suction tube dipping into the liquid in the receptacle and a delivery tube; a plunger movable within said cylinder; a manipulating rod secured to said plunger; an arresting member carried by the cylinder; stops carried by the manipulating rod, the said stops being staggered angularly and longitudinally to each other and coming into engagement with the arresting member so as to limit the travel of the plunger within the pump cylinder; retaining members carried on the manipulating rod and arranged at heights corresponding to the different stops of the said manipulating rod; and a retractible stop carried by the cylinder and engaging in one of the retaining members of the manipulating rod to prevent the accidental return of the plunger to its delivery position.

5. In a measuring-filler for liquids: a receptacle for a liquid; a pump cylinder with a lower end member mounted on the receptacle, the end member of the said cylinder having a suction and delivery chamber and suction and delivery channels establishing communication between the said chamber and the cylinder; a suction tube mounted on the end member of the cylinder and dipping into the liquid in the receptacle and discharging into the chamber; a suction valve fitted within the chamber and normally closing the suction tube; a delivery valve fitted within the chamber above the openings of the suction and delivery channels; a spring bearing upon the end member and tending to close the delivery valve; a delivery tube mounted on the end member of the cylinder and opening into the chamber above the delivery valve; a plunger movable within the pump cylinder; and a manipulating rod secured to the said plunger.

6. In a measuring-filler for liquids, in combination, a receptacle for liquid, a pump cylinder mounted on the receptacle and having a suction tube dipping into said liquid and a delivery tube, a plunger movable within said cylinder, a manipulating rod secured to said plunger and freely rotatable within said cylinder, said rod having peripherally spaced longitudinal grooves and an annular recess establishing communication between said grooves, an arresting member carried by said cylinder and engaging in said recess whereby rotation of said rod will position said arresting member within any selected groove, stops carried by said rod in said grooves, said stops being staggered longitudinally and being adapted to encounter the arresting member so as to limit the plunger travel, an index-finger carried by said rod, and a graduated scale carried by said cylinder and indicating the various angular positions of said stops relative to said arresting member.

EUGENE MAURICE MANE.
GABRIEL PIERRE MANE.